Oct. 14, 1969   KOTARO HORIUCHI ET AL   3,471,876
SYNTHETIC RESIN BOAT

Filed Nov. 27, 1967   6 Sheets-Sheet 1

INVENTOR.
Kotaro Horiuchi et al.
BY
Attorneys

United States Patent Office 3,471,876
Patented Oct. 14, 1969

3,471,876
SYNTHETIC RESIN BOAT
Kotaro Horiuchi, Hamamatsu-shi, and Akira Takeshige, Hamana-gun, Japan, assignors to Yamaha Halsudoki Kabushiki Kaisha, Hamakita-shi, Japan, a joint-stock company of Japan
Filed Nov. 27, 1967, Ser. No. 685,892
Claims priority, application Japan, Dec. 7, 1966, 41/79,837; Jan. 31, 1967, 42/8,113; Mar. 20, 1967, 42/17,303
Int. Cl. B63b 5/24
U.S. Cl. 9—6                                      10 Claims

ABSTRACT OF THE DISCLOSURE

The upper parts of the hull sides of a synthetic resin boat are formed into a gunwale molding of high buoyancy for safety and of high rigidity whereby the hull interior can be free of reinforcement members, and the boat can thereby be stacked compactly and stably with several other identical boats.

---

This invention relates to relatively small water surface craft and more particularly to improvements in boats fabricated from synthetic resins as the principal materials.

In general, small boats of this type readily sink when they are swamped or are tipped on their beam ends because the specific gravity of the hull material is greater than that of water and because of the open nature of the hull construction. As one conventional measure for preventing a boat of this character from sinking, the hull is provided with a double bottom to form a flotation compartment between the upper and lower parts of the double bottom.

While a boat, with such a double bottom is thereby prevented from sinking when it is swamped or heeled over on its beam ends, it is unstable in this state since the positions of the center of buoyancy and center of gravity are such as to impart a capsizing moment to the hull as described more fully hereinafter, whereby the boat has the dangerous tendency to turn completely over into a bottom-up state.

Furthermore, synthetic resin boats have heretofore been provided within their hulls with reinforcement members such as ribs or frames, longitudinal members such as stringers and keelsons, and thwarts serving principally as seats, with these reinforcement members being used for strengthening the hull to withstand water pressure and bending and torsional stress on the hull. To protect the hull against impact and abrasion at its gunwale part, an open molding is provided around the gunwale to serve as a fender member.

Because of the above mentioned reinforcement members in the interiors of these boats, these members occupy much space and interfere with stacking of the boats, whereby difficulties and inconvenience in transportation and storage of the boats are caused.

It is an object of the present invention to provide a safe boat having buoyancy at its upper part when submerged whereby the boat has both sufficient flotation and righting moment when it is swamped or capsized.

Another object of the invention is to provide a boat having an uncluttered interior into which the hull of another identical boat can be inserted deeply, whereby a plurality of these boats can be stacked to form a dense, compact, and stable stack, in which the loads are successively transmitted through the gunwale parts of the boats.

Still another object of the invention is to provide a boat having high strength for resisting torsional and bending stresses and other stresses imparted during use without reinforcement members projecting into the interior space of the hull.

A further object of the invention is to achieve the foregoing objects through simple and relatively inexpensive organization of parts.

According to the present invention, briefly summarized, there is provided a boat which has a hull side structure of a shape and dimensions at its upper part providing high buoyancy when submerged in water and high rigidity, and which has detachable thwarts and an uncluttered interior whereby the boat can be stacked with a plurality of other identical boats in a mutually and deeply fitted manner to form a dense, compact, and stable stack for convenient and economical transportation and storage.

The nature, principle, details, and utility of the invention will be more clearly apparent from the following detailed description with respect to preferred embodiments of the invention when read in conjunction with the accompanying drawings, in which like parts are designated by like reference numerals and characters.

Figure 1:
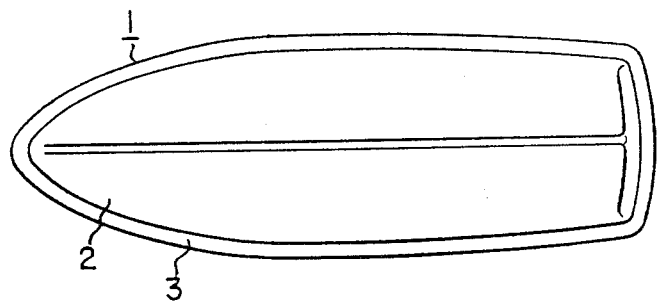
FIGS. 1 and 2 are respectively a plan view and a side elevational view showing one example of a boat according to the invention.
Figure 2:
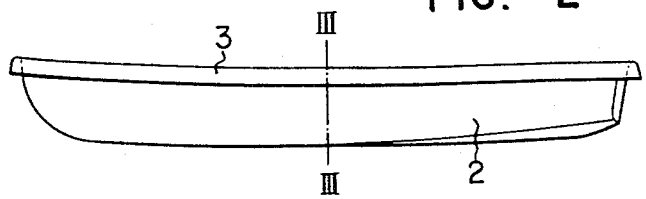
Figure 3:
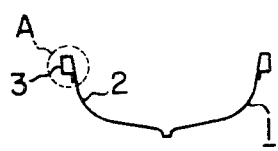
FIG. 3 is a sectional view taken along the line III—III in FIG. 2.
Figure 4:
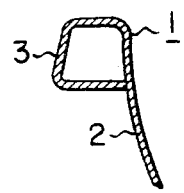
Figure 5:
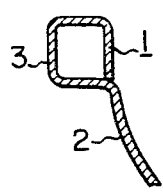
Figure 6:
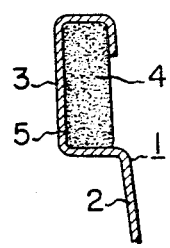
Figure 7:
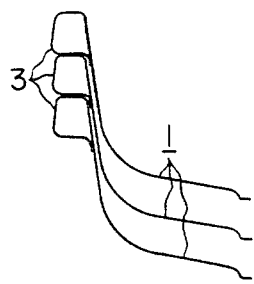
Figure 8A:
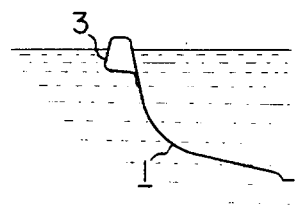
Figure 8B:
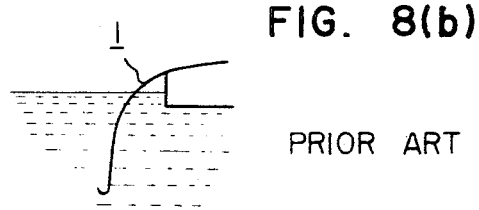
Figure 9:
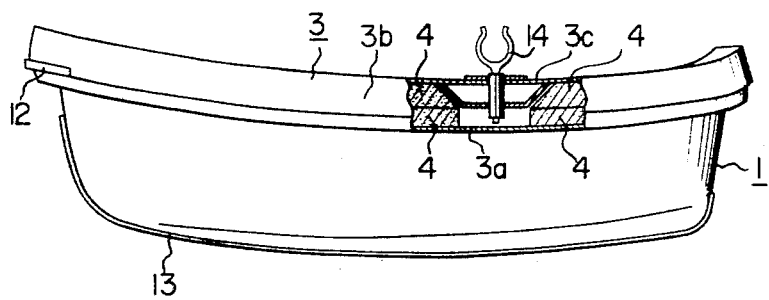
Figure 10:
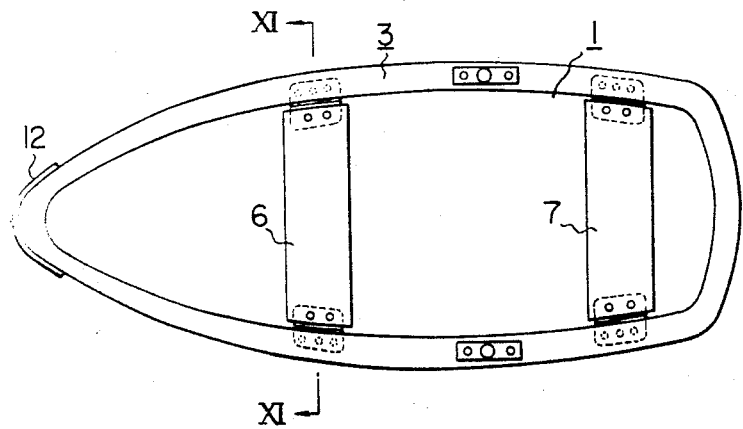
Figure 11:
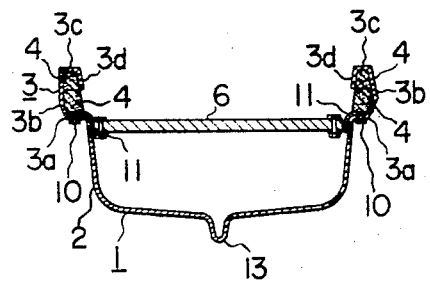
Figure 12:
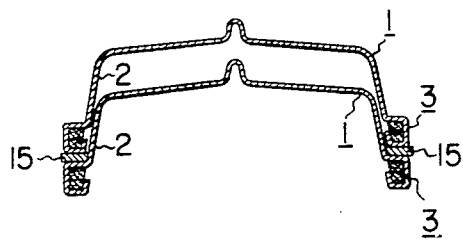
Figure 13:
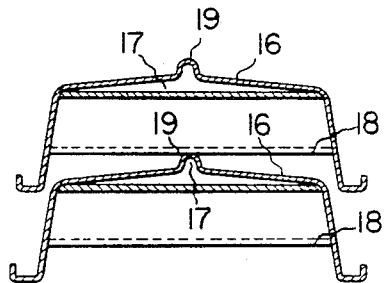
Figure 14:
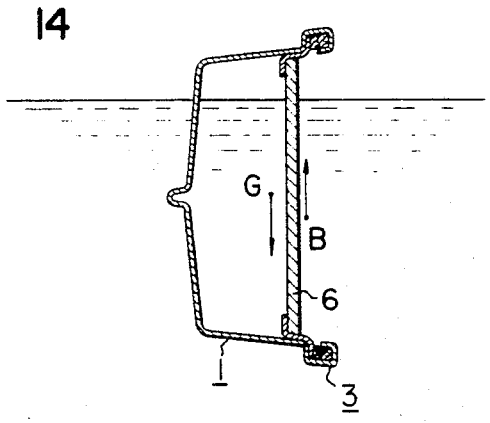
Figure 15:
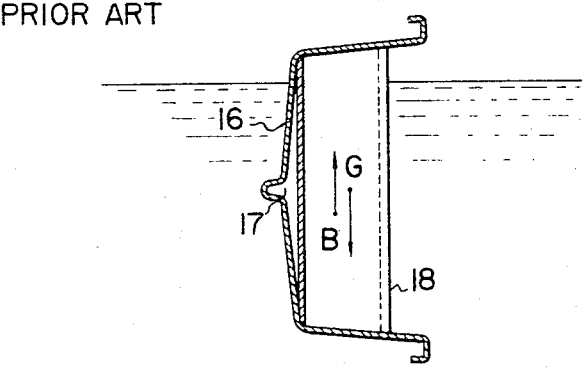
Figure 16:
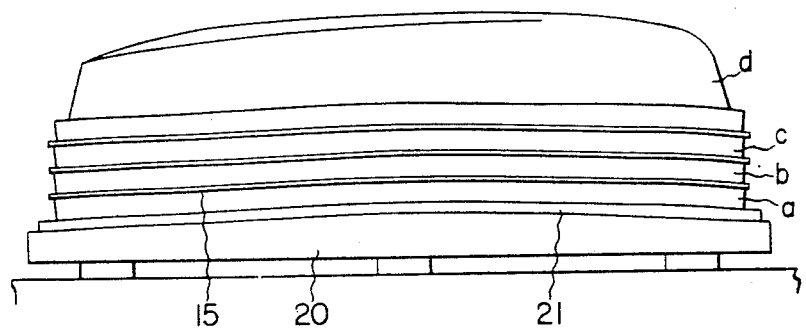
Figure 17:
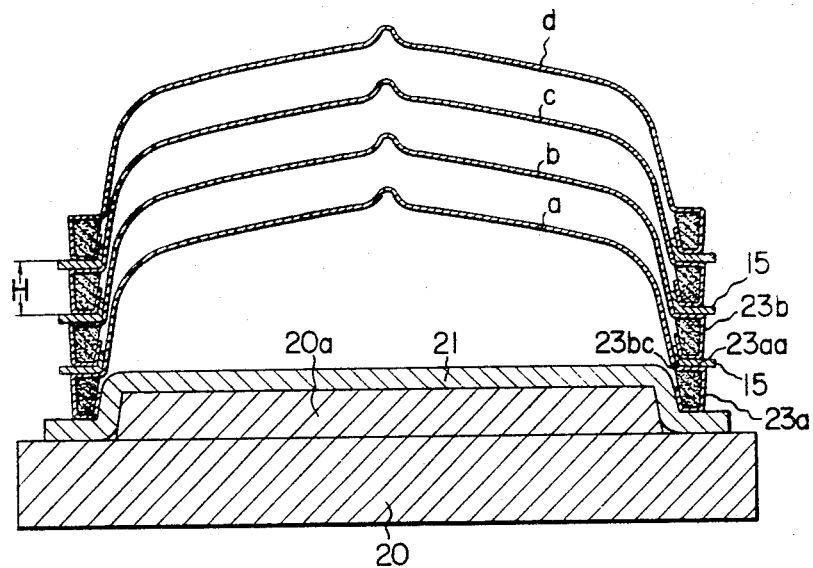

FIGS. 4, 5, and 6 are relatively enlarged fragmentary views, in cross section, respectively showing modifications of the gunwale designated by reference character A in FIG. 3;

FIG. 7 is a half sectional view showing a number of boats each as shown in FIGS. 1, 2, and 3 in a stacked state;

FIG. 8(a) is a half sectional view indicating a boat according to the invention in a submerged or swamped state;

FIG. 8(b) is a half sectional view indicating a conventional boat with buoyant bottom in a capsized state due to swamping;

FIGS. 9 and 10 are respectively a side elevational view, with a part cut away, and a plan view showing another example of a boat according to the invention;

FIG. 11 is a cross sectional view taken along the line XI—XI in FIG. 10, the view looking in the direction of the arrows;

FIG. 12 is a cross sectional view showing boats each as shown in FIGS. 9, 10, and 11 in an overturned and stacked state;

FIG. 13 is a similar cross sectional view showing conventional boats in an overturned and stacked state;

FIG. 14 is a cross sectional view showing the forces of gravity and buoyancy acting on the boat shown in FIGS. 9, 10 and 11 in a swamped and partly capsized state;

FIG. 15 is a view similar to FIG. 14 in the case of a conventional boat with a buoyant bottom;

FIG. 16 is a side elevational view showing a plurality of boats according to the invention in an overturned and stacked state on a pallet;

FIG. 17 is a cross sectional view of the stack of boats shown in FIG. 16; and

Figure 18:
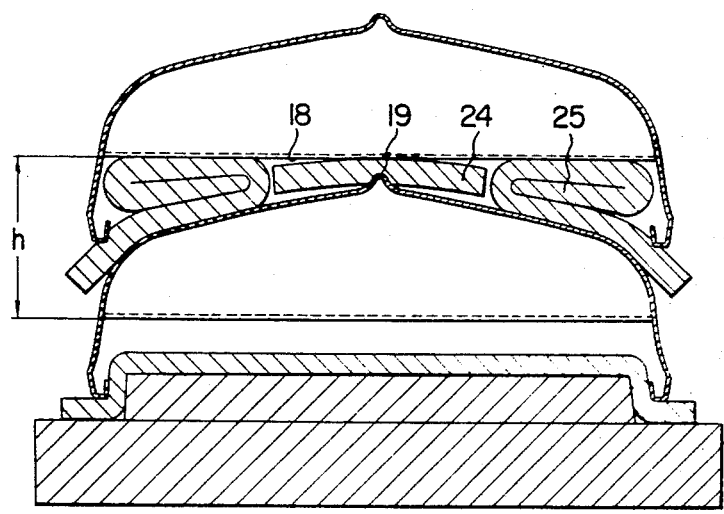

FIG. 18 is a cross sectional view showing a known method of stacking conventional boats.

Referring first to FIGS. 1 through 5, there is shown an example of a boat according to the invention. This boat has a hull 1 made of fiber-reinforced synthetic resin with hull sides 2 which are formed by bending along their sheer lines to form gunwales 3 each in the form of a molding of a hollow, closed-figure cross section.

The gunwales 3 may be formed by bending the upper edges of the hull sides outward, downward, and then inward as indicated in FIG. 4 or outward, upward, inward, and then downward as indicated in FIG. 5, with the hollow molding structure in either case being tightly sealed to form a flotation compartment. Alternatively, as shown in FIG. 6, the upper edge of the hull side is first bent outward, then upward, inward, and finally downward but is left unclosed, and the cavity thus formed in the molding is filled with a low-density material 4, such as a polystyrene foam material, which is bonded into place by means of an adhesive 5.

The gunwale flotation moldings 3 are designed to have a volume to provide sufficient buoyancy such that the hull 1 will not sink below the water surface when it is completely swamped and is carrying the designated number of passengers. These flotation moldings may be continuously formed around the entire gunwale and upper edge of the transom of the hull 1, or then may be intermittently formed provided they fulfil the above mentioned requirement for design volume.

By the above described organization of the boat hull according to the invention, the gunwale flotation molding 3 is formed integrally with the hull 1 and functions as a reinforcement of the gunwale of the hull sides and as a fender. Furthermore, the molding 3 provides the hull with the ample strength to resist torsion and bending stresses and rigidity to retain its shape without the need for separate reinforcing members.

Moreover, since additional reinforcing members are not needed within the hull 1, a plurality of hulls 1 can be readily stacked into a compact tier for facility and convenience in transportation and storage as indicated in FIG. 7 and as described more fully hereinafter.

In addition, when the above described boat is swamped as indicated in FIG. 8(a) it is not easily capsized and tends to remain upright since the center of buoyancy is in the upper part of the hull 1. Even if the boat turns turtle, the hull bottom will emerge well above the water surface because of the low density of the gunwale part of the hull sides, whereby the righting of the hull 1 in the water will be facilitated. In contrast, a conventional boat with a flotation bottom compartment as indicated in FIG. 8(b) is readily capsized and, after turning turtle, tends to remain in the bottom-up position and resist efforts to right the boat.

A more specific example of a boat embodying the invention is illustrated in FIGS. 9, 10, and 11. The small rowboat shown has a hull 1 formed from fiber-reinforced synthetic resin and provided with a gunwale molding 3 similar in construction to that described hereinbefore with reference to FIG. 6. More specifically, the gunwale molding 3 comprises an outwardly-bent, shelf-like bottom wall 3a, an upwardly bent vertical wall 3b, an inwardly bent upper wall 3c, and a downwardly bent partial wall 3d lying substantially in an extension of the plane of the hull side 2. The hollow interior of the molding 3 thus formed is filled with a low-density flotation material such as polyethylene foam or polystyrene foam, with the flotation material being divided into upper and lower parts 4, 4 in the example illustrated.

The other parts of the hull 1 are of conventional design, there being provided a keel member 13, a rowlock (or oarlock) including an oar crutch 14, and a fender member 12 for protecting the fore part of the molding 3.

The interior of the hull 1 is provided with thwarts 6 and 7, which are detachably fixed at their ends to the hull by brackets 11 resting on the aforementioned shelf-like bottom wall 3a of the molding 3 and fixed thereto by bolts 10. By unscrewing the bolts 10, the thwarts 6 and 7 can be readily removed from the hull 1.

The hull 1 is thus reinforced by the molding 3, which also functions in a submerged state as a flotation body. Accordingly, even when the boat is tipped on its beam ends and is swamped as indicated in FIG. 14, the center of buoyancy B is positioned farther from the hull bottom than the center of gravity G, whereby the hull 1 tends to right itself. The hull 1 is then is a swamped state but does not sink because of the buoyancy provided by the flotation molding 3.

In contrast, when a conventional boat with a flotation bottom compartments 17 is tipped similarly on beam ends and is swamped as indicated in FIG. 15, the center of buoyancy B is closer to the hull bottom 16 than the center of gravity G. Consequently, the hull tends to capsize to the bottom-up state.

Furthermore, a conventional rowboat of this type is ordinarily provided with one or more fixed thwarts which are readily removable. Consequently, when these boats are stacked for storage or transportation as indicated in FIG. 13, the keel 19 of the hull of one boat contacts the upper surface of one or more thwarts 18 of the adjacent boat. Accordingly, the boats are stacked in an unstable state, and the total stack height, moreover, is considerable, whereby such boats cannot be readily stacked and are uneconomical in this respect. Furthermore, a keel 19 contacting a thwart 18 of an adjacent boat imparts thereto a concentrated stress, which gives rise to damage.

In an attempt to overcome at least some of these difficulties, it has heretofore been a common practice to use padding as indicated in FIG. 18. As shown, a padding 24 such as a mat is interposed between the keel 19 of an inverted boat and one or more thwarts 18 of another inverted boat stacked thereon, and a large quantity of padding 25 is stuffed into the starboard and port spaces between the two boats. By this stacking method, however, a considerable quantity of soft padding is necessary, whereby the effective stacking height h per boat is large, and the number of boats which can be stacked per unit floor area for storage or transportation is small. Furthermore, the soft padding 25 does not provide a stable stacking structure, whereby a stack of boats according to this method easily collapses or is upset.

In contrast, boats according to the present invention as illustrated in FIGS. 9, 10, and 11 can be stacked, after removal of the thwarts 6 and 7, into a compact and stable stack as indicated in FIG. 12 and as described hereinafter with reference to FIGS. 16 and 17. A simple padding 15 is interposed between the gunwale moldings 3 of adjacent boats.

By designing the boats to have flared hull sides, i.e., hull sides inclined upward and outward, which is a logical and general feature of boats of the instant class, and by disposing the gunwale molding 3 entirely outboard of the upper part of the hull side 2, each boat in a stacked state can be inserted to maximum depth in the adjacent boat, whereby the effective stacked height per boat is a minimum as determined by the sum of the height of the gunwale molding 3 and the compressed thickness of the padding 15.

In a specific example of stacking boats according to the invention as illustrated in FIGS. 16 and 17, a base structure such as a pallet 20 is fabricated or adapted to support and hold the lowermost boat a in a stable manner. In the example illustrated, the pallet 20 supports boats a, b, c, and d stacked in inverted state and therefore has an upper surface conforming to the sheer of the upper surface of the gunwale molding 23a of the boat a and a chock structure 20a for the preventing horizontal shifting of the stock.

In stacking the boats on this pallet 20, the pallet is first placed on level ground or a floor, and a padding such as a mat 21 is laid thereon. The lowermost boat a is then inverted and placed and fitted on the pallet 20 over the mat 21. In most cases, it is not necessary to remove the thwarts of the lowermost boat a.

Next, the second boat b, after all of its thwarts have been removed, is inverted and fitted onto the bottom of the lowermost boat a, the pieces of padding 15 being interposed between the two boats at their gunwale parts, that is, between a shoulder surface 23aa of the gunwale molding 23a of boat a and upper surface 23bc (lower surface as viewed in FIG. 17) of the molding 23b of boat b. Similarly, the other boats c, and d are successively stacked. While four boats are shown in FIGS. 16 and 17, the number of boats in each stack may be varied at will as necessary.

When boats are thus stacked, the effective stacked height per boat is equal to the sum H of the height of the gunwale molding 23 and the compressed thickness of the padding 15 as indicated in FIG. 17. This height H is substantially smaller than the aforementioned height h in the case of stacked conventional boats as indicated in FIG. 18. It has been found that in most cases the height H can be made less than one half of h, whereby the number of boats according to the invention which can be stacked for the same floor area and the same total stack height is more than two times that in the case of conventional boats.

Furthermore, since all boats are supported around their respective gunwales, the entire stack is much more stable and there is lower possibility of the collapse or upsetting thereof than that in the case where the boats are supported principally by keels, and, moreover, there is no possibility of damage due to concentrated stress. Another advantageous feature of the invention is that further economy in transportation and storage is afforded by the relatively small quantity of materials such as padding required therefor.

In order to indicate still more fully the utility of the invention, the following comparative example of actual stacking in practice is set forth, it being understood that this example and the details thereof are presented as illustrative only and that they are not intended to limit the scope of the invention.

In transporting rowboats, each of length-over-all of 10 feet, by truck, it was found that the following numbers of boats could be loaded in the case of boats according to the invention and in the case of conventional boats.

| | Loading method | Stacks per truck | Boats per stack | Total boats loaded |
|---|---|---|---|---|
| Truck type by capacity rating: | | | | |
| 8-ton | Invention | 6 | 13 | 78 |
| | Conventional | 6 | 1 5 | 30 |
| 6-ton | Invention | 4 | 13 | 52 |
| | Conventional | 4 | 1 5 | 20 |

[1] Although there was space for 6 boats per stack, the limit was 5 boat because of risk of damaging the cargo.

While one conventional boat at a time was loaded and stacked on the truck in the above example, the stacks of the boats according to the present invention stacked previously on pallets for storage could be loaded directly in the stacked state by means of a fork lift, whereby the loading procedure was highly efficient. Furthermore, the holding means necessary for preventing the upsetting or collapsing of the stacks during transportation were found to be simpler in the case of the boats of the invention than in the case of the conventional boats.

While the invention has been described above, with respect to boats of the most common type wherein the boat, in plan view, has a length greater than the beam and has a pointed bow and a transom stern, it will be apparent that the invention can be applied with equal effectiveness to boats of the so-called double ender type and to boats of other shapes in plan view as, for example, elliptical boats and circular boats.

Furthermore, the cross sectional shape of the gunwale molding is not limited to rectangular forms as described hereinabove but may be any other suitable shape providing sufficient buoyancy and rigidity.

As described above, the present invention provides boats which can be easily fabricated and handled, and which are extremely safe, with the resultant moment on a swamped and heeled boat being in the direction to right the boat, and the stable equilibrium position of a swamped boat being the upright position.

Furthermore, because of the rigidity provided by the gunwale molding, structural reinforcing members are unnecessary in the interior of the hull of the boat of the invention, and thwarts, if necessary, can be made detachable. Accordingly, the boats according to the invention can be stacked in a mutually and deeply fitting manner to form a compact and dense stack which, moreover, is stable, and in which load stresses are distributed whereby the risk of damage to the boats is substantially reduced.

What we claim is:

1. A boat integrally made of synthetic resin material comprising a hull having upper edges and a hollow gunwale molding structure provided along said upper edges constituting a highly bouyant assemblage solely in the gunwale area as well as reinforcing the hull against torsional and bending actions, said gunwale molding structure being defined by said upper edges being bent outwardly to provide a first wall portion and perpendicularly to provide a second wall portion and terminating in a third wall portion substantially parallel to the first wall portion, whereby the hollow gunwale molding structure projects outwardy of and is substantially uniform about the entire periphery of the boat.

2. The boat as claimed in claim 1 in which said first wall portion is defined by bending the upper edge of the hull outwardly and horizontally from the hull, the second wall portion by bending the edge downwardly, and the third wall portion by bending the edge inwardly parallel to the first wall portion.

3. The boat as claimed in claim 1 in which said first wall portion is defined by bending the upper edge of the hull outwardly and horizontally from the hull, the second wall portion by bending the edge upwardly, and the third wall portion by bending the edge inwardly and horizontally parallel to the first wall portion, the extended edge of which is further bent downwardly parallel to the second wall portion to seal tightly the entire hollow molding structure to provide a floatation compartment and a highly rigid structure for reinforcement of the hull.

4. A boat integrally made of synthetic resin material comprising a hull having upper edges and a hollow gunwale molding structure provided along said upper edges said gunwale molding structure being defined by an outwardly bent horizontal bottom wall, an upwardly bent wall, an inwardly bent upper wall parallel to the bottom wall and a downwardly bent partial wall parallel to the upwardly bent wall and being open at the upper edge of the hull, and a low density material divided into upper and lower components positioned in and bonded to the place in the cavity defined by the bent walls to provide sufficiently buoyancy to the boat when the boat is swamped and to provide high rigidity for reinforcement of the hull.

5. The boat as claimed in claim 4 in which said low density material is a foamed synthetic resin.

6. The boat as claimed in any one of claims 1 and 4, in which said hollow molding structure is formed continuously around the entire gunwale and upper edge of the transom of the hull.

7. The boat as claimed in any one of claims 1 and 4, in which at least one thwart is detachably fixed at the ends thereof by supporting means to the sides of the hull thereby facilitating stacking of a plurality of boats of the same construction.

8. A boat integrally made of synthetic resin material, comprising a hull having a side defined by a single layer of said resin material and a hollow gunwale molding structure provided along the upper edge of said hull side, said hull side being provided with a flared configuration with increasing beam in the upward direction, said hollow gunwale molding structure being constituted by an outwardly bent horizontal bottom wall, an inwardly bent upper wall parallel to the bottom wall and a downwardly bent wall lying substantially in an extension of the plane of said hull side, whereby, when a plurality of such boats are stacked successively one after another on the outboard projecting gunwale molding structure, the bottom wall of preceding boats and the upper wall of subsequent stacked boats are mutually in contact and the hulls of the preceding boats are adequately accommodated in the inner surfaces of the subsequent boats for accomplishing compact stacking.

9. The boat as claimed in claim 8 in which said downwardly bent wall terminates in spaced relation to the upper edge of the hull side and a low density material is positioned in a cavity defined by said bent walls for providing sufficient bouyancy to the boat when it is swamped.

10. The boat as claimed in claim 9 in which said low density material is divided into upper and lower components and said low density material is a foamed synthetic resin.

References Cited

UNITED STATES PATENTS

| | | | |
|---|---|---|---|
| 2,919,451 | 1/1960 | Long | 9—2 |
| 2,977,607 | 4/1961 | Roblee | 9—2 |
| 3,126,856 | 3/1964 | Fuller | 114—66.5 |
| 3,328,811 | 7/1967 | Norton | 9—7 |
| 3,225,367 | 12/1965 | Gavlek | 9—1 |
| 3,019,758 | 2/1962 | Erkert | 114—219 |

FOREIGN PATENTS 1,212,868  10/1959  France.

TRYGVE M. BLIX, Primary Examiner